(12) United States Patent
Stuart et al.

(10) Patent No.: US 12,016,263 B2
(45) Date of Patent: Jun. 25, 2024

(54) MECHANICAL LINKAGE ASSEMBLY FOR CHANGING ANGLE ON DISK DRILL CLOSING WHEEL

(71) Applicant: CNH Industrial Canada, Ltd., Saskatoon (CA)

(72) Inventors: Graham Douglas Stuart, Warman (CA); Timothy David Quinney, Saskatoon (CA); Jesse Blair Pidwerbesky, Warman (CA)

(73) Assignee: CNH Industrial Canada, Ltd. (CA)

( * ) Notice: Subject to any disclaimer, the term of this patent is extended or adjusted under 35 U.S.C. 154(b) by 554 days.

(21) Appl. No.: 17/357,492

(22) Filed: Jun. 24, 2021

(65) Prior Publication Data
US 2022/0408633 A1  Dec. 29, 2022

(51) Int. Cl.
*A01C 5/06* (2006.01)
*A01B 49/02* (2006.01)
*A01B 63/26* (2006.01)

(52) U.S. Cl.
CPC ............ *A01C 5/068* (2013.01); *A01B 49/027* (2013.01); *A01B 63/26* (2013.01)

(58) Field of Classification Search
CPC ....... A01C 5/066; A01C 5/068; A01B 49/027; A01B 63/26
See application file for complete search history.

(56) References Cited

U.S. PATENT DOCUMENTS

| | | | |
|---|---|---|---|
| 3,705,560 A * | 12/1972 | Lappin | A01C 7/08 111/151 |
| 4,404,918 A | 9/1983 | Whalen et al. | |
| 7,975,629 B1 | 7/2011 | Martin | |
| 8,863,857 B2 | 10/2014 | Bassett | |
| 9,402,340 B2 | 8/2016 | Patwardhan | |
| 9,585,302 B2 | 3/2017 | Anderson | |
| 9,609,802 B2 | 4/2017 | Needham et al. | |
| 11,399,456 B2 * | 8/2022 | Martin et al. | A01C 5/068 |

(Continued)

FOREIGN PATENT DOCUMENTS

| | | | |
|---|---|---|---|
| AU | 2020200978 A1 | 8/2020 | |
| CA | 2889032 A1 * | 5/2014 | A01B 49/027 |

OTHER PUBLICATIONS

U.S. Appl. No. 17/357,571, filed Jun. 24, 2021, Graham Douglas Stuart.

(Continued)

*Primary Examiner* — Tara Mayo
*Assistant Examiner* — Tara Mayo-Pinnock
(74) *Attorney, Agent, or Firm* — Rebecca L. Henkel; Rickard K. DeMille; Peter K. Zacharias (57) ABSTRACT

A row unit closing wheel assembly includes a closing wheel, a closing wheel arm, and a closing wheel shaft having a first end and a second end. The closing wheel is coupled to the first end and the closing wheel arm is coupled to the second end via a pivot joint. The row unit closing wheel assembly includes an adjustable mechanical linkage assembly coupled both to the closing wheel shaft and to the closing wheel arm. The adjustable mechanical linkage is configured to adjust an angle of the closing wheel shaft relative to the closing wheel arm along a horizontal plane via movement of the closing wheel shaft about the pivot joint. The horizontal plane is orthogonal to a rotational axis of the pivot joint.

20 Claims, 10 Drawing Sheets

(56) References Cited

U.S. PATENT DOCUMENTS

2015/0359162 A1* 12/2015 Needham et al. ..... A01C 5/068
172/603
2019/0239418 A1    8/2019  Smith
2020/0107486 A1    4/2020  Martin et al.
2021/0100158 A1*   4/2021  Martin ................... A01C 7/006

OTHER PUBLICATIONS

U.S. Appl. No. 17/357,607, filed Jun. 24, 2021, Graham Douglas Stuart.
Mowitz, David; "Industry-First Adjustable Closing Wheel Innovation Rides on Parallel Linkage"; https://www.agriculture.com/machinery/planting/industry; Feb. 14, 2019; 5 pages.
Needham AG Technologies; Raising Efficiency in Agriculture; Case IH 500/500T and New Holland 2080/205 Air Seeder Modifications; https://www.needhamag.com/innovative_product_sales/case; downloaded Jun. 24, 2021, 6 pages.

* cited by examiner

MECHANICAL LINKAGE ASSEMBLY FOR CHANGING ANGLE ON DISK DRILL CLOSING WHEEL

BACKGROUND

The present disclosure relates generally to agricultural implements.

Certain agricultural implements, such as disk drills, may be used to open trenches in a soil surface and to place agricultural product, such as seed or fertilizer, in the trenches. A disk drill may have several row units attached to a frame and arranged in a row. This arrangement may form several parallel rows of deposited agricultural product as the disk drill is pulled through a field by a tractor. Each row unit may include an opener disk that excavates a trench into the soil surface, a product chute configured to deposit the agricultural product into the trench, and a packing wheel (e.g., closing wheel) configured to pack the displaced soil on top of the agricultural product. Unfortunately, certain soil conditions (e.g., wetter soils, soils with high clay or silt content, soils with heavy field residue, etc.) keep the closing system from collapsing a sidewall of a seed trench, which negatively impacts seed germination, and ultimately yield.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a row unit closing wheel assembly includes a closing wheel, a closing wheel arm, and a closing wheel shaft having a first end and a second end. The closing wheel is coupled to the first end and the closing wheel arm is coupled to the second end via a pivot joint. The row unit closing wheel assembly includes an adjustable mechanical linkage assembly coupled both to the closing wheel shaft and to the closing wheel arm. The adjustable mechanical linkage assembly is configured to adjust an angle of the closing wheel shaft relative to the closing wheel arm along a horizontal plane via movement of the closing wheel shaft about the pivot joint. The horizontal plane is orthogonal to a rotational axis of the pivot joint.

In another embodiment, an agricultural implement includes at least one row unit closing wheel assembly. The at least one row unit closing wheel assembly includes a closing wheel, a closing wheel arm, and a closing wheel shaft having a first end and a second end. The closing wheel is coupled to the first end and the closing wheel arm is coupled to the second end via a pivot joint. The at least one row unit closing wheel assembly includes an adjustable mechanical linkage assembly is coupled both to the closing wheel shaft and to the closing wheel arm. The adjustable mechanical linkage assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint. The adjustable mechanical linkage assembly is configured to adjust the angle between multiple set angle points relative to an initial set angle point.

In another embodiment, a system for changing an angle for a closing wheel includes an adjustable mechanical linkage assembly configured to couple to both a closing wheel shaft and a closing wheel arm of a closing assembly having the closing wheel. The adjustable mechanical linkage assembly is configured to adjust the angle of the closing wheel shaft relative to the closing wheel arm along a horizontal plane via movement of the closing wheel shaft about a pivot joint coupling the closing wheel shaft to the closing wheel arm, the horizontal plane being orthogonal to a rotational axis of the pivot joint, wherein the adjustable mechanical linkage assembly is configured to adjust the angle between multiple set angle points relative to an initial set angle point. The angle at the initial set angle point is a substantially orthogonal angle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to agricultural implements, such as disk drills, capable of deposited agricultural product into a field. Disk drills may form several parallel trenches in the surface of a field as the disk drill is towed in a direction of travel, deposits agricultural product(s) within each trench, and packs displaced soil over the deposited agricultural product. The disk drill may include several row units, and each may form a respective trench as a disk of the respective row unit displaces soil. Each row unit may also include components (e.g. a product chute) that enable placement of an agricultural product, such as seed or fertilizer, in the respective trench. Each row unit may also include an independent packer wheel (e.g., closing wheel) that packs the displaced soil onto the deposited agricultural product to cover the respective trench formed by the disk. During operation of the disk drill, certain soil conditions (e.g., wetter soils, soils with high clay or silt content, soils with heavy field residue, etc.) keep the closing system from collapsing a sidewall of a seed trench, which negatively impacts seed germination, and ultimately yield.

As will be explained below, the embodiments below describe an adjustable mechanical linkage assembly for adjusting an angle of a closing wheel to enable the closing wheel to properly close an open seed trench even under more challenging soil conditions. In some embodiments, a row unit closing wheel assembly includes a closing wheel, a closing wheel arm, and a closing wheel shaft having a first end and a second end. The closing wheel is coupled to the first end and the closing wheel arm is coupled to the second end via a pivot joint. An adjustable mechanical linkage assembly is coupled both to the closing wheel shaft and to the closing wheel arm. The adjustable mechanical linkage assembly is configured to adjust an angle of the closing wheel shaft relative to the closing wheel arm along a horizontal plane via movement of the closing wheel shaft about the pivot joint. The horizontal plane is orthogonal to a rotational axis of the pivot joint.

Figure 1:
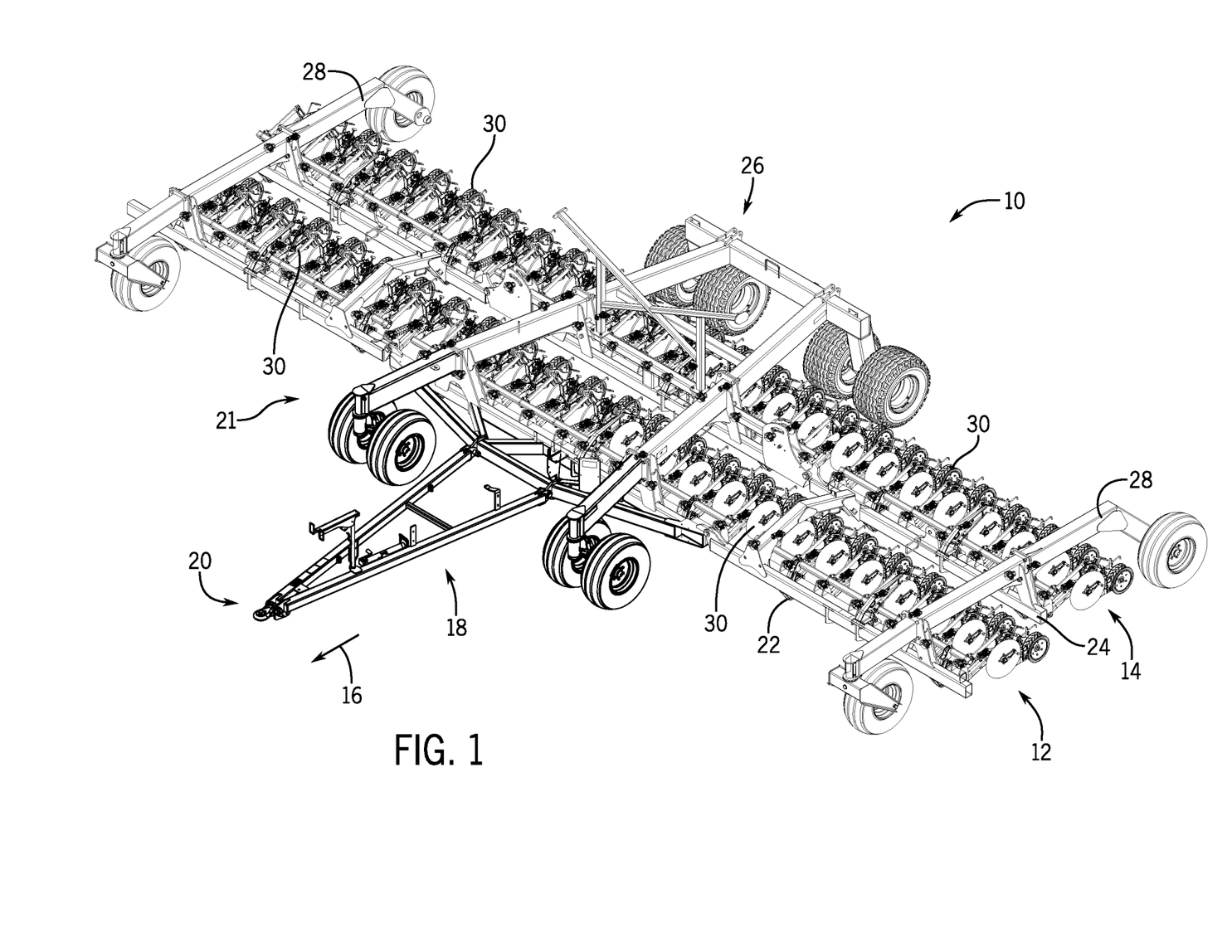
FIG. 1 is a perspective view of a disk drill with two rows of staggered row units, in accordance with an embodiment of the present disclosure.

Referring now to the drawings, FIG. 1 is a perspective view of a disk drill 10 with two rows 12, 14 of row units. The disk drill 10 may be towed by a tractor in a direction of travel 16. In the illustrated embodiment, the disk drill 10 includes an A-frame 18 and a hitch assembly 20, which may be coupled to a corresponding hitch assembly of the tractor. The A-frame 18 is coupled to a main frame 21 of the disk drill 10. In addition, the main frame 21 includes a first frame element 22 that supports a first row 12 of row units and a second frame element 24 that supports a second row 14 of row units. The frame elements 22 and 24 are connected to each other and supported by a central frame section 26 and side frame sections 28 of the main frame 21. Wheels are coupled to the central frame section 26 and the side frame sections 28 to facilitate movement of the disk drill 10 through the field. It should be understood that, while the disk drill 10 includes forty-eight row units 30 (e.g., closing wheel assemblies), arrangements with any number of row units 30 may be employed. As described in greater detail below, each row unit 30 (e.g., closing wheel assembly) may include an adjustable mechanical linkage assembly for adjusting an angle of a closing wheel.

Figure 2:
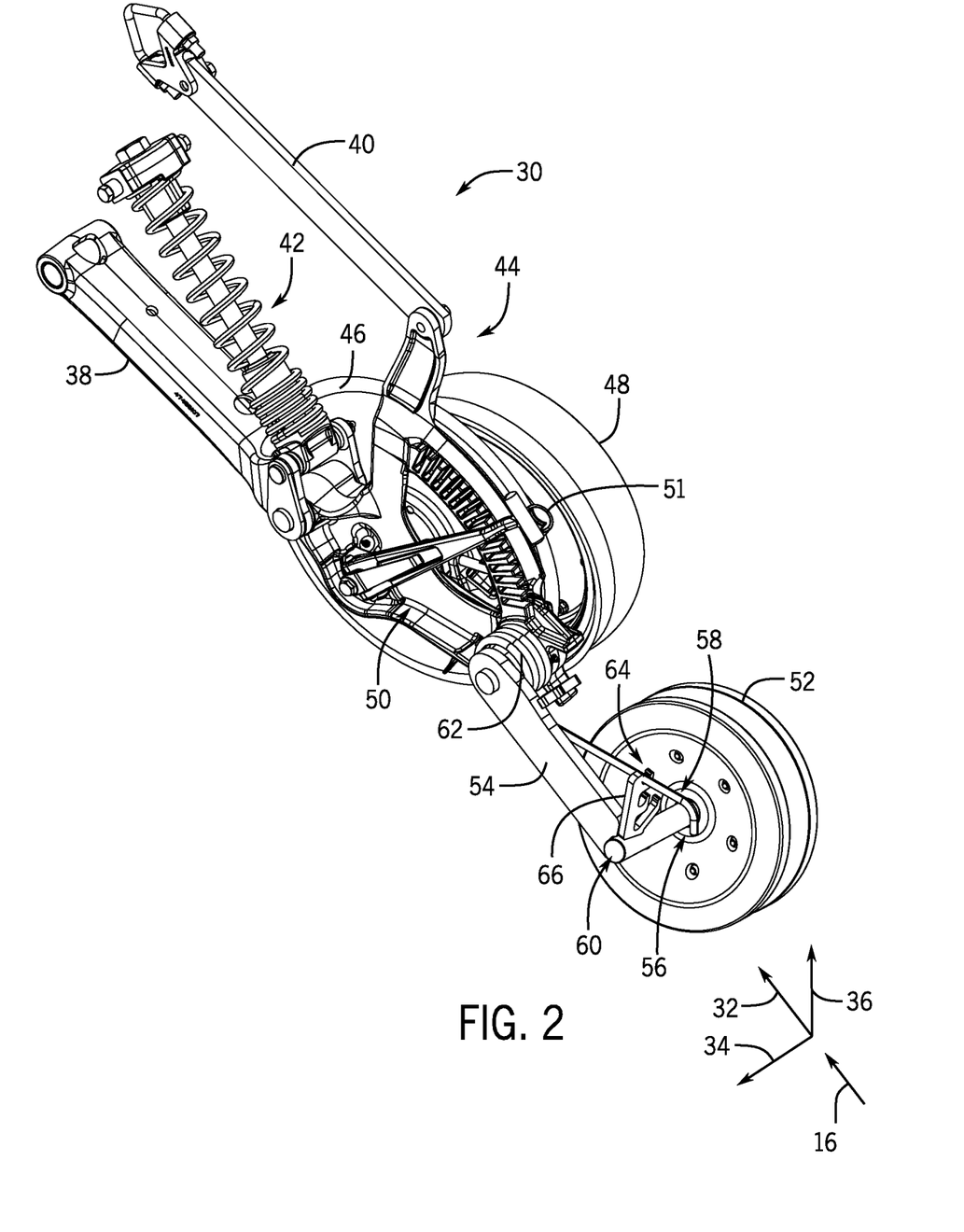
FIG. 2 is a perspective view of a disk drill row unit which may be used in the disk drill of FIG. 1, in accordance with an embodiment of the present disclosure.
Figure 3:
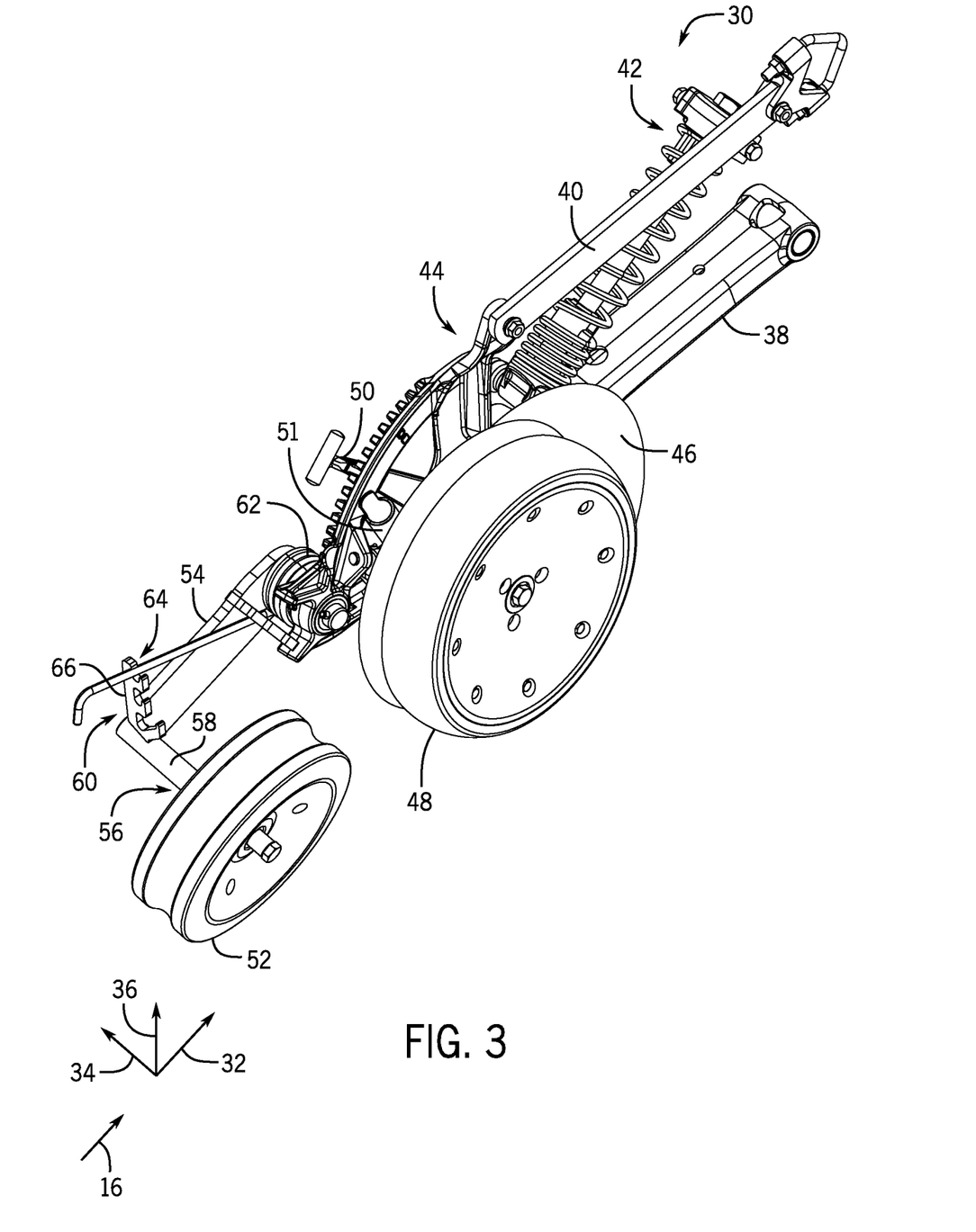
FIG. 3 is a perspective view of a disk drill row unit of FIG. 2, in accordance with an embodiment of the present disclosure.
Figure 4:
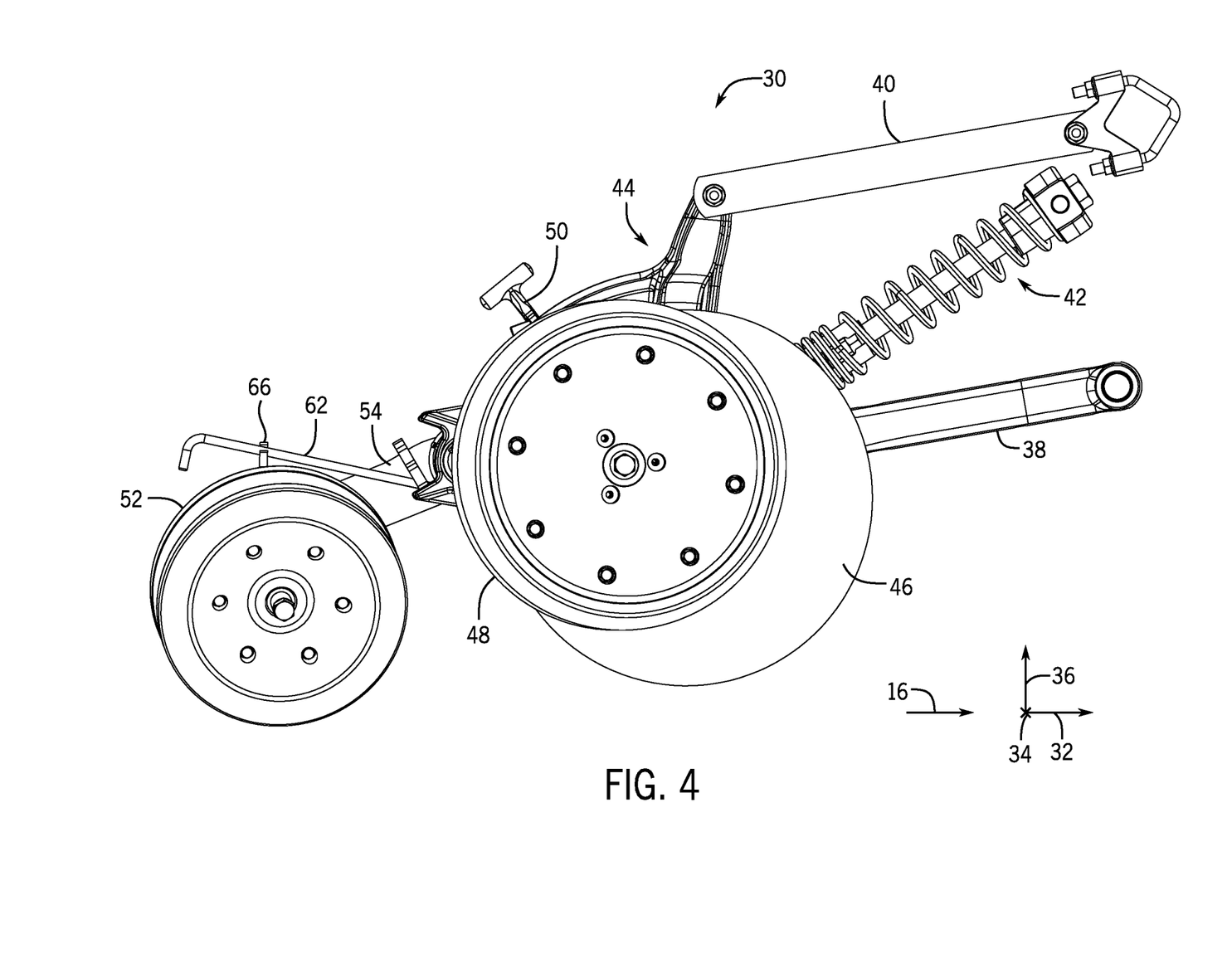
FIG. 4 is a side view of the disk drill row unit of FIG. 2, in accordance with an embodiment of the present disclosure.
Figure 5:
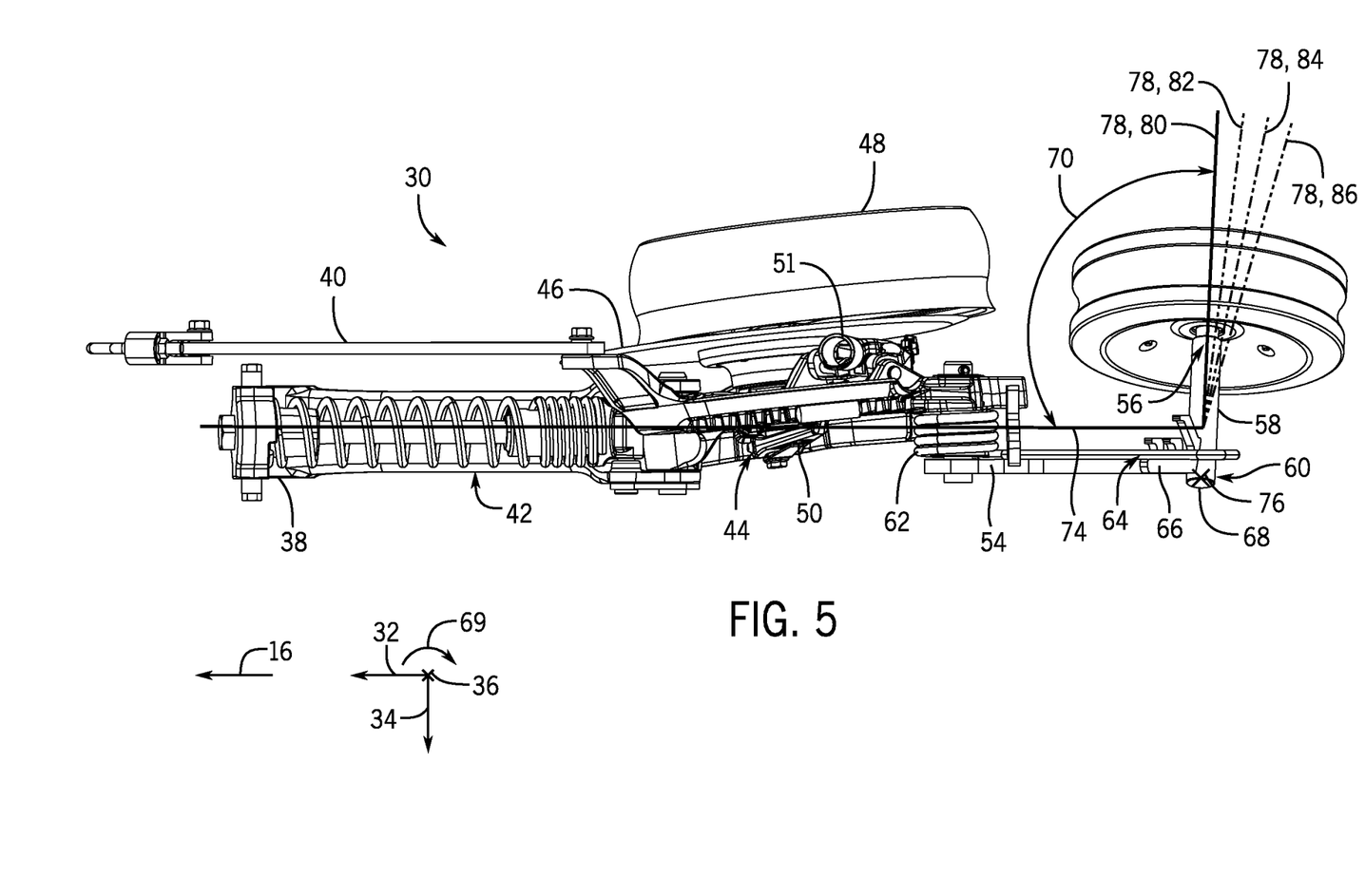
FIG. 5 is a top view of the disk drill row unit of FIG. 2, in accordance with an embodiment of the present disclosure.

FIGS. 2-5 are views of a row unit 30 that may be used in the disk drill of FIG. 1 (without the adjustable mechanical linkage assembly shown). More specifically, FIGS. 2 and 3 are perspective views of the row unit 30, FIG. 4 is a side view of the row unit 30, and FIG. 5 is a top view of the row unit 30. The row unit 30 may be described with reference to a longitudinal axis or direction, 32, a lateral axis or direction 34, and a vertical axis or direction 36.

The row unit 30 includes links 38 and 40 and a damping assembly 42 (e.g., including a spring and a damper) that are configured to couple a frame 44 of the row unit 30 to the disk drill frame 21. The damping assembly 42 may be configured to force the frame 44 against the soil surface. Damping assembly 42 may also be configured to damp upward movement of the frame 44 as the row unit 30 encounters uneven ground. A disk 46 is rotatably coupled to the frame 44. The disk 46 is configured to form a trench in the soil. The depth of the trench may be controlled by the position of the disk 46 relative to a gauge wheel 48 along the vertical axis 36. The vertical position of the gauge wheel 48 may be controlled by a depth regulator handle 50, which in turn changes the depth that the disk 46 cuts the trench in the soil. An agricultural product (e.g., seed or fertilizer) may be disposed within the trench formed by disk 46 via a product chute or conduit 51.

Closing wheel 52 couples to the frame 44 with linkage 54 (e.g., closing wheel arm). Specifically, the closing wheel 52 is coupled to a first end 56 of a closing wheel shaft or spindle 58 and a second end 60 of the closing wheel shaft 58 is coupled to closing wheel arm 54. The closing wheel 130 may be substantially laterally aligned with disk 46 to cover a trench formed by disk 46 as the row unit 30 moves in direction of travel 16. The frame 44 also supports a spring 62 that urges the closing wheel 52 toward the soil surface. The torque applied by the spring 62 may be adjusted by placing an end of the spring 62 in one of a set of slots 64 in an adjustment plate or bar 66. The pressure of closing wheel 52 may therefore be adjusted depending on the soil type, the agricultural product dispensed, etc.

As shown in FIG. 5, the closing wheel shaft 58 is coupled to the closing wheel arm 54 via a pivot joint 68 that enables the closing wheel shaft 58 to be rotated relative to the closing wheel arm 54 (e.g., in a circumferential direction 69) to adjust an angle 70 of the closing wheel shaft 58 (and, thus, the angle 68 of the closing wheel 52) relative to the closing wheel arm 54 relative to a horizontal plane (indicated by line 74 extending in directions 32 and 34). A rotational axis 76 (extending into and out of the page) of the pivot joint 68 is orthogonal to the horizontal plane 74. In certain embodiments, the pivot joint 68 may be formed be a rod, shaft, pin, or bolt connection thru the adjacent ends of the closing wheel shaft 58 and the closing wheel arm 54. As described in greater detail below, an adjustable mechanical linkage assembly may be coupled to both the closing wheel shaft 58 (e.g., directly) and the closing wheel arm 54 (e.g., directly or indirectly) and be configured to adjust the angle 70. Adjustments to change the adjustable mechanical linkage assembly to change the angle 70 may occur in a tool-less manner.

The adjustable mechanical linkage assembly may adjust the closing wheel shaft 58 relative to the closing wheel arm 54 (and, thus, the angle 70) between a number of fixed positions 78 associated with set angle points. The positions 78 may include an initial position 80 associated with an initial set angle point. The angle 70 for the initial set angle point at the initial position 80 is a substantially orthogonal angle (e.g., approximately 90 degrees±0.5 degrees). For example, the angle 70 for the initial set angle point may be approximately 90.5 degrees. The initial set angle point may be referenced as 0 degrees. Other fixed positions 78 (e.g., positions 82, 84, 86) are represented by dashed lines 82, 84, 86. The set angle points for positions 82, 84, 86 may have a difference of approximately 5 degrees, 7.5 degrees, and 10 degrees, respectively, relative to the initial set angle point. For example, in certain embodiments, the set angle points may have an angle of approximately 95.5 degrees, 98 degrees, and 100.5 degrees. The number of positions 78 and set angle points may vary (e.g., 2, 3, 4, 5 or more positions). In certain embodiments, the number of positions 78 may be finite. The value for the angle 70 of the set angle points relative to the initial set angle point may also vary. In certain embodiments, the difference in angle change between the set angle points may vary. In other embodiments, the difference in angle change between the set angle points may be constant. The value of the angle 70 for each set angle point (other than the initial set angle point) is greater than the value of the angle 70 for the initial set angle point.

Figure 6:
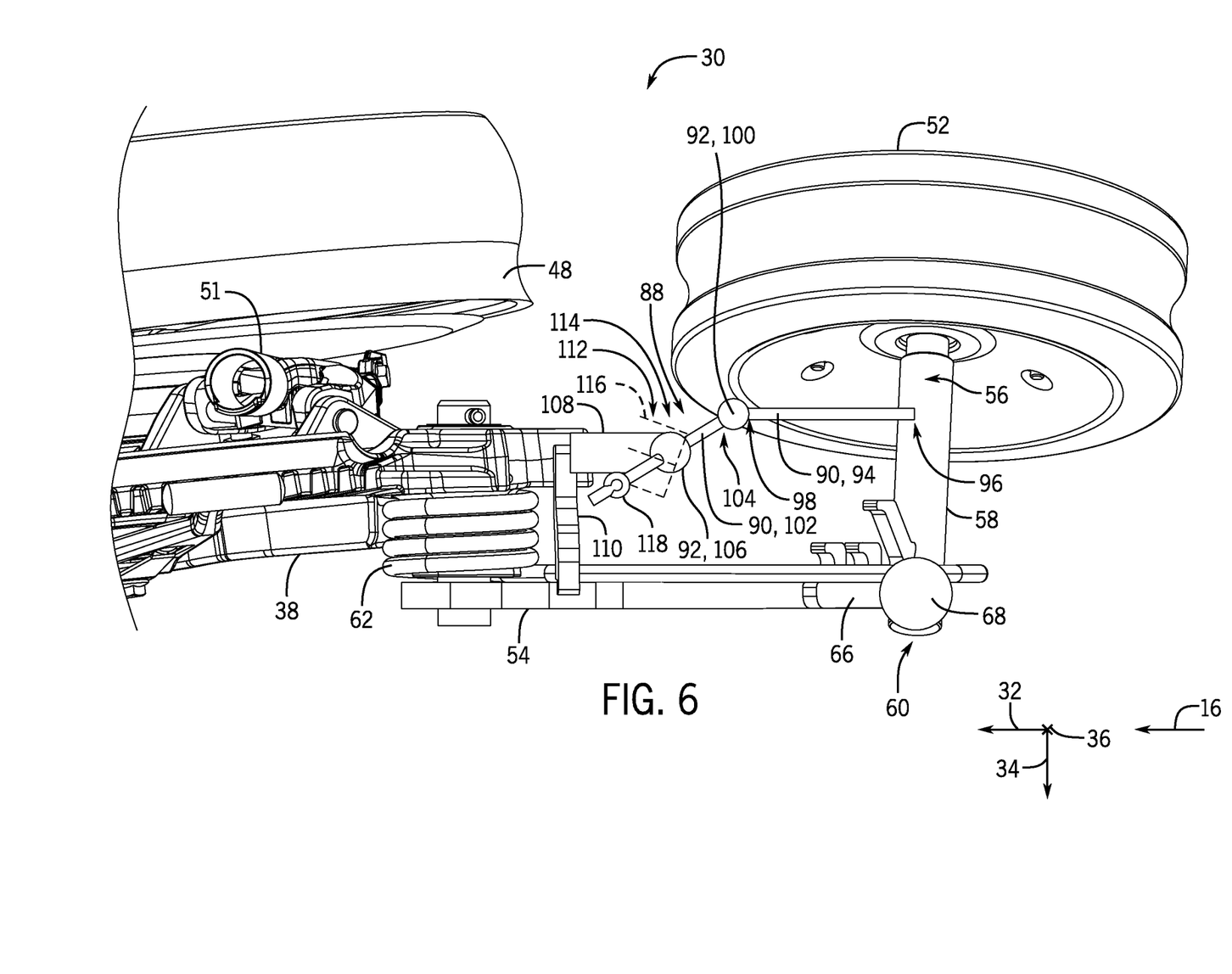
FIG. 6 is a top view of a portion of a disk drill row unit with an adjustable mechanical linkage assembly (e.g., shift linkage assembly), in accordance with an embodiment of the disclosure.

FIGS. 6-10 illustrate different embodiments of an adjustable mechanical linkage assembly that may be utilized on the row unit 30 for adjusting an angle of the closing wheel 52. FIG. 6 is a top view of a portion of the disk drill row unit 30 with an adjustable mechanical linkage assembly 88 (e.g., shift linkage assembly). The adjustable mechanical linkage assembly 88 includes multiple links 90 (e.g., linkage rods) coupled together via multiple joints 92. As depicted, a link 94 has an end 96 coupled to the closing wheel shaft 58 and an end 98 coupled to a joint 100 (e.g., universal joint). A link 102 has an end 104 coupled to the joint 100. The link 102 is coupled to (and extends through) a joint 106 (e.g., ball joint). For example, the link 102 may include a spherical portion disposed within a casing coupled to a support 108. The support 108 is coupled to a plate or bar 110 extending orthogonally (e.g., in direction 34) from the closing arm 54. In certain embodiments, the support 108 may be coupled to the link 38 or another portion of the row unit 30. The links 90 and the joints 92 form a shift linkage 112 configured to be pivoted or shifted between different positions along a set pattern 114, wherein the different positions along the set pattern represent different set angle points for the angle between the closing arm 54 and the closing wheel shaft 58. For example, the link 102 may be shifted along the set pattern (which via the joints 100, 106) causes movement of the link 94 to adjust the set angle point of closing arm 54 and the closing wheel shaft 58. As depicted, the pattern 114 has an E-shape. The pattern 114 may have any other shape that enables shifting to different positions for the different set angle points. Each end 116 of the pattern 114 may represent a different set angle point. A lock ring 118 may be disposed on (and translated along) the link 102 to secure the position of the link 102 relative to the joint 106 and, thus, the set angle point.

Figure 7:
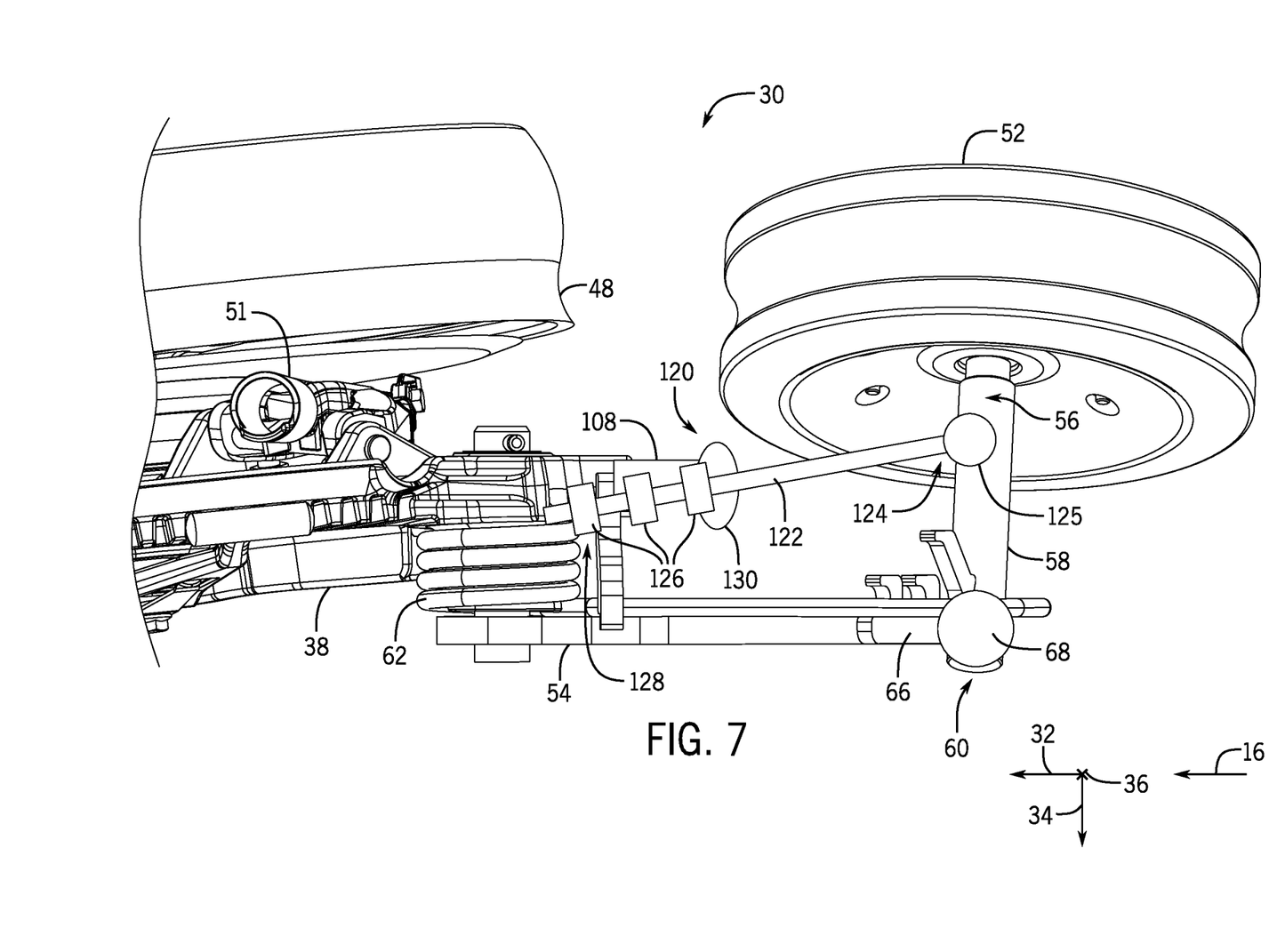
FIG. 7 is a top view of a portion of a disk drill row unit with an adjustable mechanical linkage assembly (e.g., shift linkage assembly), in accordance with an embodiment of the disclosure.

FIG. 7 is a top view of a portion of the disk drill row unit 30 with an adjustable mechanical linkage assembly 120 (e.g., shift linkage assembly). The adjustable mechanical linkage assembly 120 includes a link 122 (e.g., linkage rod). The linkage rod 122 includes an end 124 coupled to the closing arm shaft 58. In certain embodiments, the end 124 may be coupled to the closing arm shaft 58 via a joint 125 (e.g., pivot joint). The linkage rod 122 also includes a number of detents 126 adjacent an end 128 (e.g., opposite end 124). A respective detent 126 engages a detent catching or locking mechanism 130 (e.g., detent ring) that secures the position of the linkage assembly 120 and, thus, the set angle point. Each detent 126 when engaged with the locking mechanism 130 represents a different set angle point for the angle between the closing arm 54 and the closing wheel shaft 58. Thus, altering which detent 126 engages the locking mechanism 130 alters the set angle point. The locking mechanism 130 is coupled to the support 108. The support 108 is coupled to a plate or bar 110 extending orthogonally (e.g., in direction 34) from the closing arm 54. In certain embodiments, the support 108 may be coupled to the link 38 or another portion of the row unit 30.

Figure 8:
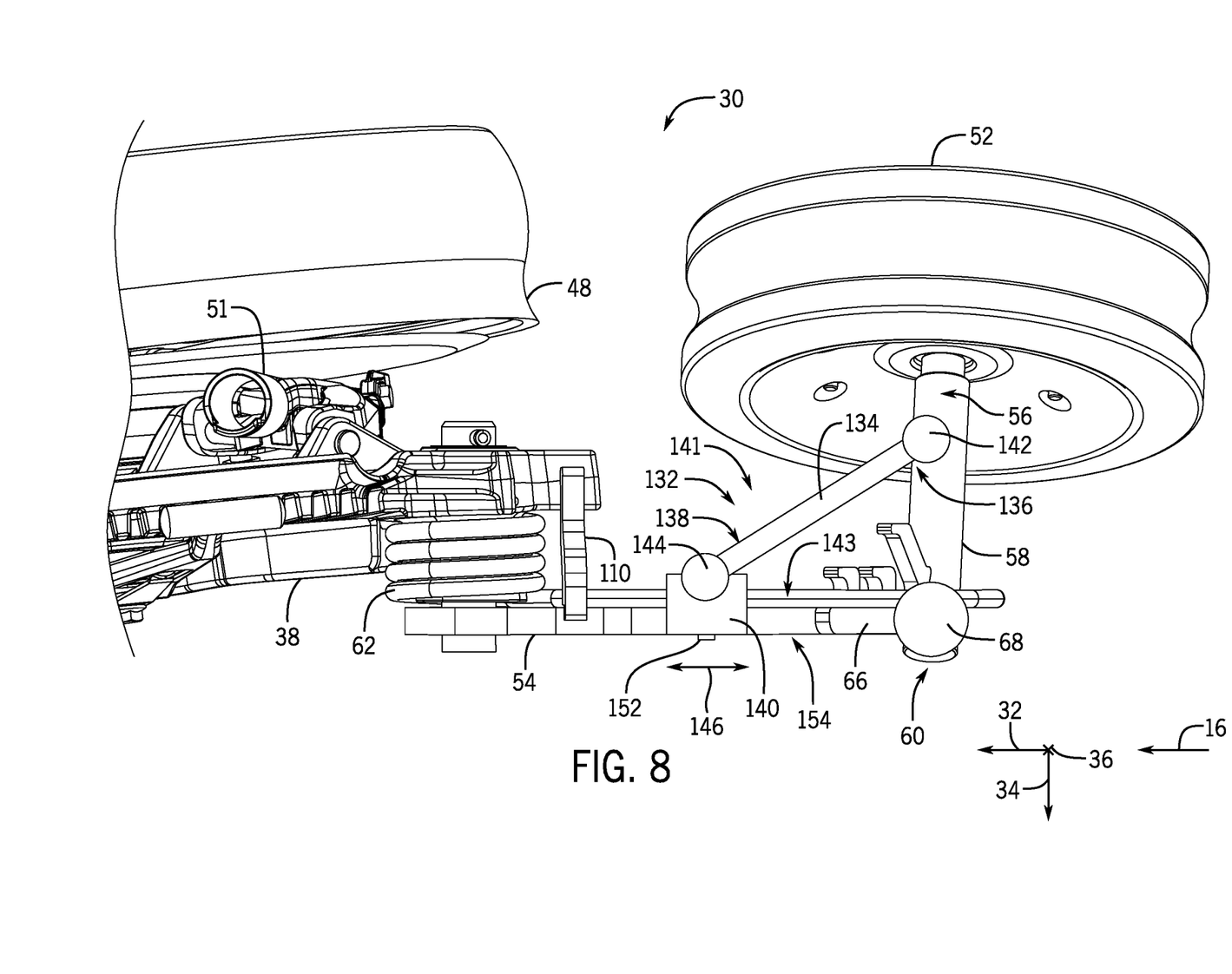
FIG. 8 is a top view of a portion of a disk drill row unit with an adjustable mechanical linkage assembly (e.g., triangular brace assembly), in accordance with an embodiment of the disclosure.

FIG. 8 is a top view of a portion of the disk drill row unit 30 with an adjustable mechanical linkage assembly 132 (e.g., triangular brace assembly). The adjustable mechanical linkage assembly 132 includes a link 134 (e.g., linkage rod). The link 134 includes an end 136 coupled to the closing arm shaft 58 and an opposite end 138 coupled to a locking mechanism 140 to form a triangular brace assembly 141. The ends 136, 138 may be coupled to the closing arm shaft 58 and the locking mechanism 140 via joints 142, 144 (e.g., pivot joints). The locking mechanism 140 is coupled to the closing arm 54 (e.g., disposed on a side 143 of the closing arm 54) facing the closing wheel 52). The locking mechanism 140 is configured to slide along the closing arm (as indicated by arrows 146 in direction 32) to different fixed positions, wherein each fixed position represents a different set angle point for the angle between the closing arm 54 and the closing wheel shaft 58.

Figure 9:
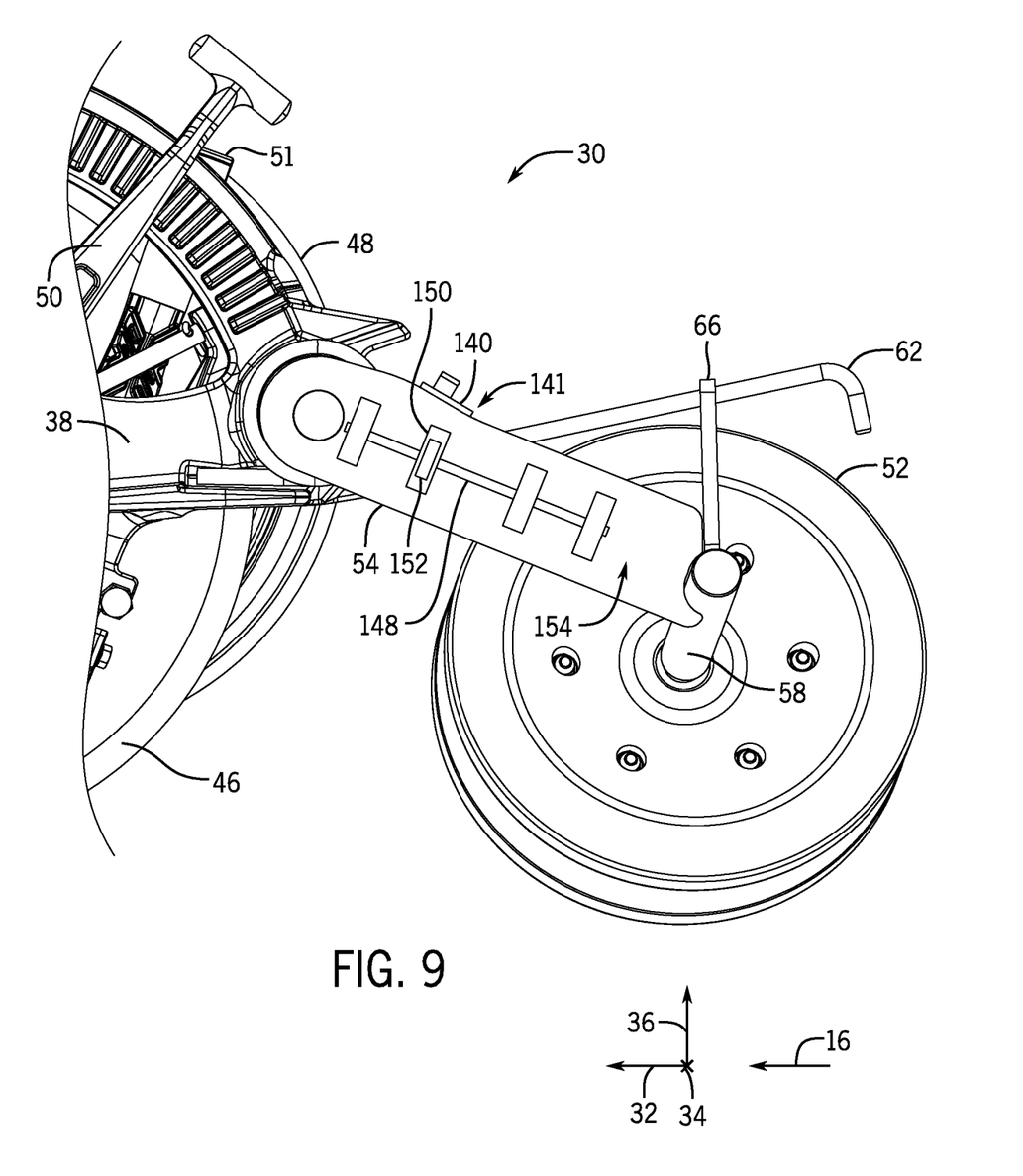
FIG. 9 is a side view of a portion of the disk drill row unit in FIG. 8, in accordance with an embodiment of the present disclosure.

As depicted in FIG. 9, the closing arm 54 (without pivot joint 68 shown) may include a slot 148 (e.g., horizontal slot extending in the direction 32) that includes multiple vertical slots 150 (e.g., extending in the direction 36). Each vertical slot 150 represents a fixed position for a corresponding set angle point. Referring to both FIGS. 8 and 9, a detent 152 on the locking mechanism 140 (as shown in FIG. 8) may extend through a respective vertical slot 150 to secure the locking mechanism 140 in a respective fixed position. A combination of the detent 152 within the vertical slot 150 and a clamping force from the locking mechanism 140 may secure the locking mechanism 140 to the closing arm 54 in the fixed position. In certain embodiments, in operation, a force may be applied in the direction 54 toward the side 143 of the closing arm 54 facing the closing wheel 52 on the locking mechanism 140 that pushes the detent 152 away from a side 154 (opposite side 143) of the closing arm 52 and out of the vertical slot 150 to enable the locking mechanism to be slid along the slot 148 to a different position (e.g., different vertical slot 150). Removing the force, enables the detent 152 to settle within the vertical slot 150 at the different position. In other embodiments, the locking mechanism 140 may slide along the closing arm 54 for positioning in different positions representing different set angle points by other mechanisms.

Figure 10:
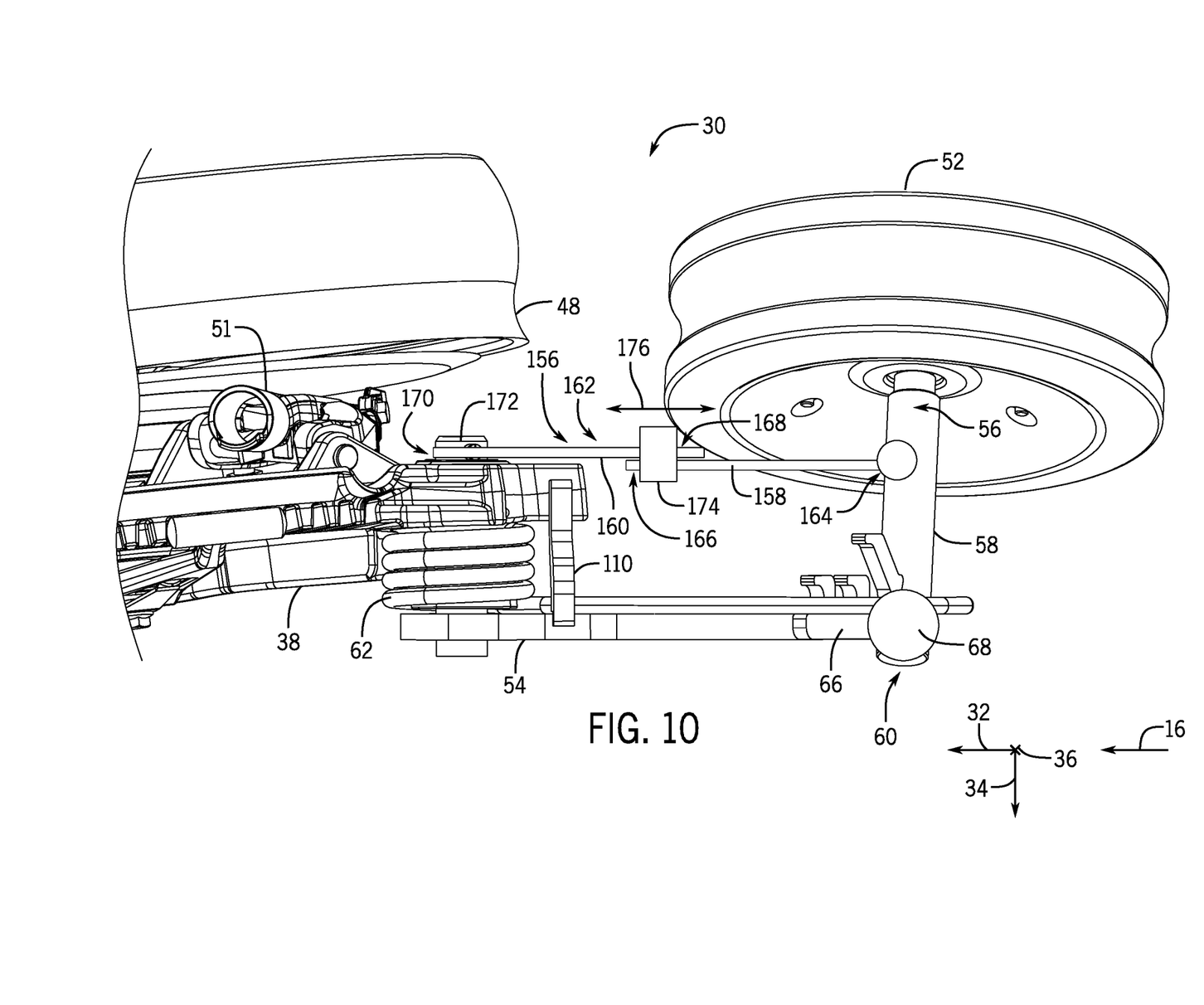
FIG. 10 is a top view of a portion of a disk drill row unit with an adjustable mechanical linkage assembly (e.g., paired linkage assembly), in accordance with an embodiment of the disclosure.

FIG. 10 is a top view of a portion of the disk drill row unit 30 with an adjustable mechanical linkage assembly 156 (e.g., paired linkage assembly). The adjustable mechanical linkage assembly 156 includes a link 158 and a link 160 that forms a paired linkage assembly 162. The link 158 includes ends 164, 166. The link 160 includes ends 168, 170. The end 164 of the link 158 is coupled to the closing wheel shaft 58. The end 170 of the link 160 is coupled to a closing arm post 172 that extends orthogonally (e.g., in direction 34) from the closing arm 54. In particular, the closing arm post 172 extends from the closing arm 54 through a portion of the spring 62 and the link 38. The ends 166, 168 of the links 158, 160 are coupled together via a retention or locking mechanism 174. Besides coupling the ends 166, 168, the retention or locking mechanism 174 enables one end 166 to be adjusted relative to the other end 168 (e.g., as indicated by arrows 176 along the direction 32) so that the angle set point may be adjusted for altering the angle between the closing arm 54 and the closing arm shaft 58. The ends 166, 168 overlap each other along the direction 32. The relationship of the ends 166, 168 may be adjusted to different positions each representing different set angle points. The retention or locking mechanism 174 may include a mechanism (e.g., screw, bolt, etc.) for relaxing the connection (e.g., for adjustments) or tightening the connection (e.g., for maintaining a fixed position) between the ends 166, 168.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit closing wheel assembly, comprising:
   a closing wheel;
   a closing wheel arm;
   a closing wheel shaft having a first end and a second end, wherein the closing wheel is coupled to the first end and the closing wheel arm is coupled to the second end via a pivot joint; and
   an adjustable mechanical linkage assembly coupled both to the closing wheel shaft and the closing wheel arm, wherein the adjustable mechanical linkage assembly is configured to adjust an angle of the closing wheel shaft relative to the closing wheel arm along a horizontal plane via movement of the closing wheel shaft about the pivot joint, and wherein the horizontal plane is orthogonal to a rotational axis of the pivot joint.

2. The row unit closing wheel assembly of claim 1, wherein the adjustable mechanical linkage assembly is configured to adjust the angle between a plurality of set angle points relative to an initial set angle point.

3. The row unit closing wheel assembly of claim 2, wherein the angle at the initial set angle point is a substantially orthogonal angle.

4. The row unit closing wheel assembly of claim 3, wherein the angle for each set angle point of the plurality of set angle points other than the initial set angle point is greater than the angle for the initial set angle point.

5. The row unit closing wheel assembly of claim 1, wherein the adjustable mechanical linkage assembly is coupled to a support extending from the closing wheel arm.

6. The row unit closing wheel assembly of claim 5, wherein the adjustable mechanical linkage comprises a detent ring coupled to the support, a linkage rod having a third end and a fourth end, the third end being coupled to the closing wheel shaft, the fourth end comprising a detent configured to engage the detent ring to set the angle.

7. The row unit closing wheel assembly of claim 6, wherein the detent is one of a plurality of detents on the fourth end of the linkage rod, where each detent of the plurality of detents represents a different set angle point for the angle when engaged with the detent ring.

8. The row unit closing wheel assembly of claim 5, wherein the adjustable mechanical linkage comprises a shift linkage comprising a plurality of linkage rods coupled together via a plurality of joints, the shift linkage is configured to be pivoted between different positions along a set pattern, and the different positions along the set pattern represent different set angle points for the angle.

9. The row unit closing wheel assembly of claim 1, wherein the adjustable mechanical linkage assembly is coupled to the closing wheel arm.

10. The row unit closing wheel assembly of claim 9, wherein the adjustable mechanical linkage comprises a link coupled to the closing wheel shaft and the closing wheel arm to form a triangular brace.

11. The row unit closing wheel assembly of claim 10, wherein the link comprises a third end and a fourth end, the third end being coupled to the closing wheel shaft, the fourth end being coupled to a locking mechanism, wherein the locking mechanism is disposed on the closing wheel arm and is configured to slide along the closing wheel arm to a fixed position from among a plurality of fixed positions, and wherein each fixed position of the plurality of fixed positions represents a different set angle point for the angle.

12. The row unit closing wheel assembly of claim 1, wherein the adjustable mechanical linkage comprises a first link coupled to a second link, the first link being coupled to the closing wheel shaft and the second link being coupled to a closing wheel arm post extending from the closing wheel arm, and wherein a position of the first link relative to the second link is configured to be adjusted to change the angle.

13. An agricultural implement, comprising:
   at least one row unit closing wheel assembly, comprising:
      a closing wheel;
      a closing wheel arm;
      a closing wheel shaft having a first end and a second end, wherein the closing wheel is coupled to the first end and the closing wheel arm is coupled to the second end via a pivot joint; and
      an adjustable mechanical linkage assembly coupled both to the closing wheel shaft and the closing wheel arm, wherein the adjustable mechanical linkage assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint, and wherein the adjustable mechanical linkage assembly is configured to adjust the angle between a plurality of set angle points relative to an initial set angle point.

14. The agricultural implement of claim 13, wherein the angle at the initial set angle point is a substantially orthogonal angle.

15. The agricultural implement of claim 13, wherein the angle for each set angle point of the plurality of set angle points other than the initial set angle point is greater than the angle for the initial set angle point.

16. The agricultural implement of claim 13, wherein the agricultural implement comprises a disk drill.

17. A system for changing an angle for a closing wheel, comprising:

an adjustable mechanical linkage assembly configured to couple to both a closing wheel shaft and a closing wheel arm of a closing wheel assembly having the closing wheel, wherein the adjustable mechanical linkage assembly is configured to adjust the angle of the closing wheel shaft relative to the closing wheel arm along a horizontal plane via movement of the closing wheel shaft about a pivot joint coupling the closing wheel shaft to the closing wheel arm, the horizontal plane being orthogonal to a rotational axis of the pivot joint, wherein the adjustable mechanical linkage assembly is configured to adjust the angle between a plurality of set angle points relative to an initial set angle point, and wherein the angle at the initial set angle point is a substantially orthogonal angle.

18. The system of claim 17, wherein the angle for each set angle point of the plurality of set angle points other than the initial set angle point is greater than the angle for the initial set angle point.

19. The system of claim 17, wherein the adjustable mechanical linkage assembly comprises at least one link coupled to the closing wheel shaft between the closing wheel and the pivot joint.

20. The system of claim 17, wherein the adjustable mechanical linkage assembly comprises a shift linkage assembly comprising a plurality of linkage rods coupled together via a plurality of joints, and wherein the shift linkage is configured to be pivoted between different positions along a set pattern, and the different positions along the set pattern represent the plurality of set angle points for the angle.

* * * * *